United States Patent Office 3,808,206
Patented Apr. 30, 1974

3,808,206
BIS-BASIC KETONES OF PHENOXATHIINS AND
ANTIVIRAL COMPOSITIONS THEREOF
Robert W. Fleming and Arthur De Witt Sill, Cincinnati,
Ohio, assignors to Richardson-Merrell Inc., New York,
N.Y.
No Drawing. Filed June 29, 1971, Ser. No. 158,122
Int. Cl. A61k 27/00; C07d 89/16
U.S. Cl. 260—246 B                                6 Claims

ABSTRACT OF THE DISCLOSURE

Bis-basic ketones of phenoxathiins have antiviral activity when administered orally and parenterally. The compounds are represented by the following formula:

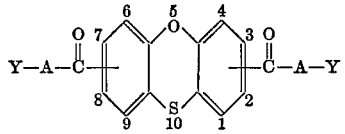

wherein A is a straight or branched alkylene chain having from 1 to 6 carbon atoms; and each Y is selected from (A) the group

wherein $R^1$ and $R^2$ are individually selected from hydrogen, lower alkyl having from 1 to 6 carbon atoms, cycloalkyl having from 3 to 6 carbon atoms, alkenyl of from 3 to 6 carbon atoms and having the vinyl unsaturation in other than the I-position of the alkenyl group; or (B) the group

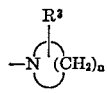

wherein $n$ is a whole integer of from 4 to 6 and $R^3$ is selected from hydrogen or lower alkyl of from 1 to 4 carbon atoms and can be linked to any one of the carbon atoms of the heterocyclic group; or (C) the group

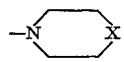

wherein X is oxygen or $NR^4$, and $R^4$ is hydrogen or lower alkyl of from 1 to 4 carbon atoms;

or pharmaceutically acceptable acid addition salts thereof.

These compounds can be prepared by several different methods. Antiviral compositions and methods of inhibiting or inactivating viruses by administering to hosts an antivirally effective quantity of an active ingredient are disclosed herein.

FIELD OF INVENTION

This invention relates to compounds having antiviral activity, compositions which have antiviral activity and to the use of such compositions for inhibiting or inactivating viruses by subjecting a host or a host and a virus susceptible to replication inhibition to an antivirally effective quantity of such compositions.

SUMMARY OF THE INVENTION

It has now been found that compounds of the formula

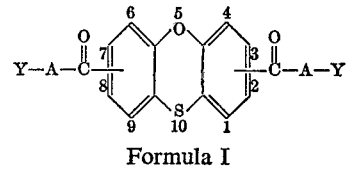

Formula I wherein A is a straight or branched alkylene chain having from 1 to 6 carbon atoms; and each Y is selected from (A) the group

wherein $R^1$ and $R^2$ are individually selected from hydrogen, lower alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or (B) the group

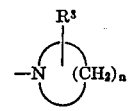

wherein $n$ is a whole integer of from 4 to 6 and $R^3$ is selected from hydrogen or lower alkyl of from 1 to 4 carbon atoms and can be linked to any one of the carbon atoms of the heterocyclic group; or (C) the group

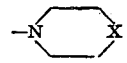

wherein X is oxygen or $NR^4$, and $R^4$ is hydrogen or lower alkyl of from 1 to 4 carbon atoms;

or pharmaceutically acceptable acid addition salts thereof are effective for inactivating or inhibiting a broad variety of viruses.

DISCUSSION OF PRIOR ART

Compounds of the above Formula I wherein Y is the group

and the group

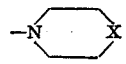

wherein $R^1$, $R^2$ and X are as defined hereinbefore, are novel compounds. Compounds of the type of Formula I wherein A is methylene or ethylene and Y is the group

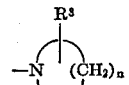

wherein $n$ is 5 and $R^3$ is H have been previously described in Chemical Abstracts, vol. 32, 7467⁵ (1938), Chemical Abstracts, vol. 57, 10515h (1962) and in Deasy, Chem. Rev., 32, 173–94 at pp. 184–5 (1943).

DETAILED DESCRIPTION OF INVENTION

Each basic ketone group, that is, the radical

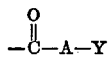

of Formula I, can be linked to one of the benzenoid rings of the tricyclic ring system of the phenoxathiin by replacement of any of the four hydrogen atoms of the benzenoid ring to which such radical is attached. Thus, one of the groups can be in any of the positions 1 through 4 of the tricyclic ring system and the other can be in any of positions 6 through 9. Preferably, one of the basic ketone radicals is in the 2- or 3-position and the other is in the 7- or 8-position of the tricyclic ring system. Most preferably, one of the basic ketone groups is in the 2-position and the other in the 7- or 8-position.

Each of the symbols A in the compounds of the above Formula I is an alkylene group having from 1 to about 6 carbon atoms which can be a straight chain, that is, for example, —CH$_2$—(CH$_2$)$_m$— wherein $m$ is a whole integer from 0 to 5, or a branched chain. Each of the alkylene groups as represented by A can be the same or different. Preferably these groups are the same. Illustrative of alkylene groups as represented by A there can be mentioned, for example, methylene, 1,2-ethylene, 1,3-propylene 1,4-butylene, 1,5-pentylene, 1,6-hexylene, 2-methyl-1,4-butylene, 2-ethyl-1,4-butylene, 3-methyl-1,5-pentylene and the like.

Each amino group of the compounds of Formula I, that is,

can be a primary, a secondary or a tertiary amino group. Each R$^1$ and R$^2$ is individually hydrogen, lower alkyl having from 1 to about 6 carbon atoms, cycloalkyl having from 3 to 6 carbon atoms, alkenyl of from 3 to 6 carbon atoms and having the vinyl unsaturation in other than the 1-position of the alkenyl group. Preferably each of the amino groups as represented by

is a tertiary amino group.

The term lower alkyl as used in reference to the compounds of Formula I relates to straight or branched alkyl chains having from 1 to about 6 carbon atoms. Illustrative of lower alkyls as can be represented by each R$^1$ or R$^2$ in the compounds of Formula I there can be mentioned, for example, methyl, ethyl, n-propyl, isopropyl, n-butyl, secondary-butyl, n-amyl, isoamyl, n-hexyl and the like.

Illustrative of cycloalkyl groups as represented by each R$^1$ and R$^2$ in the compounds of Formula I there can be mentioned, for example, cyclopropyl, cyclobutyl, cyclopentyl, and cyclohexyl.

When R$^1$ or R$^2$ in the compounds of Formula I represents an alkenyl group, the vinyl unsaturation is in a position other than the 1-position of said alkenyl group. Illustrative of alkenyl groups as can be represented by R$^1$ or R$^2$ there can be mentioned, for example, allyl, 3-butenyl, 4-hexenyl and the like.

Each heterocyclic group of Formula I, that is,

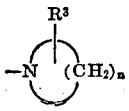

can be a monocyclic heterocyclic group or substituted monocyclic heterocyclic group. The heterocyclic groups in the compounds of Formula I can be 5-, 6- or 7-membered rings, that is, $n$ is 4, 5 or 6. The R$^3$ group can be hydrogen or a straight or branched lower alkyl chain of from 1 to about 4 carbon atoms. Illustrative of heterocyclic groups as represented by each

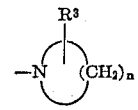

there can be mentioned, for example, piperidino, pyrrolidino, 4-methylpiperidino, 3-methylpiperidino, 4-tert-butylpiperidino or the like.

The heterocyclic group of Formula I, that is

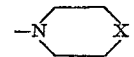

in addition to the one nitrogen atom, contains a second hetero atom, that is, X is oxygen or NR$^4$. The R$^4$ group can be hydrogen or a straight or branched lower alkyl chain of from 1 to about 4 carbon atoms. As examples of heterocyclic groups as represented by

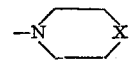

there can be mentioned, for example, morpholino, piperazino, N-(lower)alkylpiperazino, such as, for example, N-methyl- or N-ethylpiperazino and the like.

Illustrative of base compounds of this invention as represented by Formula I there can be mentioned 2,8-bis(5-piperidinovaleryl)phenoxathiin,
2,7-bis(diethylaminoacetyl)phenoxathiin dihydrochloride,
2,7-bis(3-diethylaminopropionyl)phenoxathiin dihydrochloride,
2,7-bis(N-methylcyclohexylaminoacetyl)phenoxathiin,
2,7-bis(piperidinoacetyl)phenoxathiin,
2,7-bis(morpholinoacetyl)phenoxathiin,
2,7-bis(3-diethylaminopropionyl)phenoxathiin,
2,7-bis(4-dimethylaminobutyryl)phenoxathiin,
2,7-bis(5-piperidinovaleryl)phenoxathiin,
2,8-bis-(4-piperidinobutyryl)phenoxathiin,
2,7-bis(4-piperidinobutyryl)phenoxathiin,
2,7-bis(4-morpholinobutyryl)phenoxathiin,
2,7-bis(5-diallylaminovaleryl)phenoxathiin,
2,8-bis[4-(n-methylpiperazino)butyryl]phenoxathiin,
3,7-bis(diethylaminoacetyl)phenoxathiin,
1,6-bis(3-dibutylaminopropionyl)phenoxathiin,
4,6-bis(diallylaminoacetyl)phenoxathiin,
1,9-bis(6-dibutylaminocaproyl)phenoxathiin,
3,7-bis(4-ethylaminobutyryl)phenoxathiin and the like.

Pharmaceutically acceptable acid addition salts of the base compounds of this invention are those of any suitable inorganic or organic acids. Suitable inorganic acids are, for example, hydrochloric, hydrobromic, sulfuric or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic and the like, or sulfonic acids such as methane sulfonic, 2-hydroxyethane sulfonic acid and the like. Mono- or di-acid salts may be formed, and the salts can be hydrated or substantially anhydrous.

It has been found that the compounds of this invention are effective for inactivating or inhibiting a broad variety of viruses and can thus be employed as antiviral agents. These compounds are effective for preventing or inhibiting characteristic viral disease symptoms in a host by a wide variety of methods of application and composition. They can be administered for an antiviral effect by means which subject the host, or such host and a virus, to the active ingredients. The host is subjected to the active ingredients by bringing together an active ingredient and host, for example, by applying or contacting the host with such active ingredient or simply administering the active ingredient to the host. This includes subjecting the host to such active ingredient prior to infection with a virus, that is, prophylactic use, as well as subjecting the host to such active ingredient after infection, that is, therapeutic use. Thus, in viable biological material hosts subjected to the active ingredients, the replication of viruses is inhibited when the host is infected before or after being subjected to such ingredients. Also, administration by various routes of the active ingredients to an animal host prior to or after infection with the virus prevents or inhibits viral replication and the development of the various disease conditions characteristic of the particular virus. By the term "infection" we simply mean invasion of the host with a pathogenic virus. By the term "host" we mean viable biological material or intact animals which are capable of inducing the formation of interferon and which can support the replication of a virus. Preferably the host is of animal and particularly warm blooded or mammalian origin. Illustrative of hosts for various viruses there can be mentioned viable biological material such as can be used in the production of vaccines, for example, tissue cultures such as that of kidney, lung, amnion cells, embryos, for example, chick allantoic fluid; and various animals, for example, warm blooded animals such as birds or mammals, including mice, rats, guinea pigs, gerbils, ferrets and the like.

The mode of activity of the active ingredients is not rigorously defined. Inter alia, the active ingredients induce the formation of interferon when a host is subjected to such ingredients. Interferon is a known antiviral substance which is involved with the inhibition of the replication of viruses in the presence of a host cell. Some of the viruses susceptible to replication inhibition by interferon are set forth in Horsfall and Tamm, "Viral and Rickettsial Infections of Man," 4th ed. (1965), J. B. Lippencott Company, pp. 328–329.

The compounds of the present invention can be administered to animals such as warm blooded animals and particularly mammals to prevent or inhibit infections of picornavirus, for example, encephalomyocarditis; myxovirus, for example, Influenza $A_2$ (Jap/305); arbovirus, for example, Semliki forest; herpes virus group, for example, herpes simplex; and poxviruses; for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, a daily dosage of the active ingredients will generally range from less than about 0.1 to over about 500 mg. (milligram) per kg. (kilogram) of body weight. Illustratively, dosage levels of the administered active ingredient can be intravenous, 0.1 to about 10 mg./kg.; intraperitoneal, 0.1 to about 50 mg./kg.; subcutaneous, 0.1 to about 250 mg./kg.; oral, 0.1 to about 500 mg./kg. and preferably about 1 to about 250 mg./kg.; intranasal instillation, 0.1 to about 10 mg./kg.; and aerosol, 0.1 to about 10 mg./kg. of animal body weight.

The novel compounds, together with conventional pharmaceutical carriers can be employed in unit dosage forms such as solids, for example, tablets or capsules or liquid solutions, suspensions or elixirs for oral administration and injections, or liquid solutions, suspensions, emulsions and the like for parenteral use. The quantity of active ingredient in each dosage will generally differ depending on the type of unit dosage, the type of animal and its weight. Thus, each dosage can contain from less than about 2.0 mg. to over 3 grams of active ingredients in a significant quantity of a non-toxic pharmaceutical carrier of the type that can be taken orally, applied topically, bucally or parenterally.

The pharmaceutical carrier can, as previously indicated, be a sterile liquid such as water and oils, with or without the addition of a surfactant. Illustrative of oils there can be mentioned those of petroleum, animal, vegetable or synthetic origin, for example, peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, for example, isotonic saline, will ordinarily contain from about 0.5% to 25% and preferably from about 1 to 10% by weight of the active ingredient in the composition.

As mentioned above, oral administration can be in a suitable suspension or syrup, in which the active ingredient ordinarily will constitute from about 0.5 to 10%, and preferably from about 1% to 5%, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, etc.

The active ingredients can also be admixed in animal feed or incorporated into the animal's drinking water. For most purposes, an amount of active ingredient will be used to provide from about 0.0001% to 0.1% by weight of the active ingredient based on the total weight of feed intake. Preferably, from 0.001% to 0.02% by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5% to about 95% by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

The feed compositions, as well as the feed concentrates, can additionally contain other components of feed concentrates or animal feeds, as will be readily understood. Other particularly important additives include proteins, carbohydrates, fats, vitamins, minerals, antibiotics, etc.

For use as aerosols the active ingredients can be packaged in a pressurized aerosol container together with a gaseous or liquefied propellant, for example, dichlorodifluoromethane, carbon dioxide, nitrogen, propane, etc. with the usual adjuvants such as co-solvents, and wetting agents, as may be necessary or desirable.

Typical surface active agents (Kirk and Othmer, Encyclopedia of Chemical Terminology, 1954, vol. 13, p. 513), particularly emulsifying and dispersing agents which can be used in the compositions of this invention are, for example, fatty alcohol sulfates such as sodium lauryl sulfate, aliphatic or aromatic sulfonates, such as sulfonated castor oil, and non-ionic types of emulsifying or dispersing agents such as the high molecular weight alkyl polyglycol ethers, such as dodecyl polyglycol ethers containing from about 25 to 75 carbon atoms.

A desirable mode of administration for the compounds (active ingredients) of this invention is parenterally, such as by normally liquid injectable compositions, for example, for intramuscular or subcutaneous administration. In such compositions the quantity of active ingredient can vary from about 0.05% to 20% by weight of the composition and preferably from about 0.1% to 10% by weight. In order to minimize or eliminate irritation at the site injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, for example, sterile liquids such as water, saline, and aqueous dextrose (glucose) and related sugar solutions. The quantity of surfactant in the formulation can vary from about 5% to 15% by weight of the formulation. The quantity of a compound of this invention, either in the base form or a pharmaceutical acceptable acid addition salt in such formulations, can vary over a broad range, such as that mentioned hereinbefore, that is, 0.05% to 20% by weight of the formulation. Preferably, the active ingredient is in the base form. The remaining component or components of such formulations can be a normally liquid pharmaceutical carrier, for example, isotonic aqueous saline, either alone or together with conventional excipients for injectable compositions. The surfactant can be a single surfactant having the above-indicated HLB or a mixture of two or more surfactants wherein such mixture has the indicated HLB. The following surfactants are illustrative of those which can be used in such formulations. (A) Polyoxyethylene derivatives of sorbitan fatty acid esters, such as the Tween series of surfactants, for example, Tween 80, and the like. The Tweens are manufactured by Atlas Powder Company. (B) High molecular weight adducts of ethylene oxide with a hydrophobic base formed by the condensation of propylene oxide with propylene glycol, for example, Pluronic F–68 which is manufactured by Wyandotte Chemical Company. The preferred surfactant is Polysorbate 80, U.S.P., a polyoxyethylene sorbitan monooleate.

One of the methods used to prepare the compounds of this invention is illustrated by the following reaction scheme:

Reaction 1

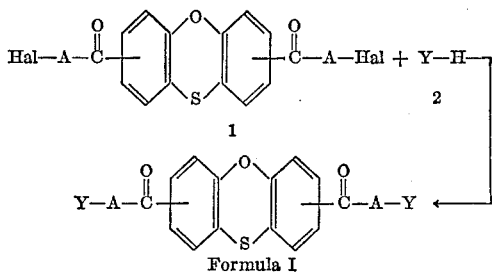

Formula I

In the above reaction, A and Y have the meanings defined hereinbefore, and each Hal is either chlorine, bromine or iodine.

The bis-(ω-haloalkanoyl)phenoxathiin derivatives, 1, in which the position of substitution is 2,7- or 2,8- can be prepared by a Friedel-Crafts acylation of phenoxathiin. Of suitable acylating agents which may be used there can be mentioned, for example, chloroacetyl chloride, bromoacetyl bromide, 3-chloropropionyl chloride, 4-chlorobutyryl chloride, 5-chlorovaleryl chloride, 5-chloro-4-methylvaleryl chloride, 5-chloro-3-methylvaleryl chloride and the like.

It is apparent that the acylation reaction may be carried out in a variety of solvents and under catalysis of a variety of Lewis acids. The temperature and duration of the reaction may be varied to allow for optimum reaction conditions. A preferred procedure is to combine one equivalent of phenoxathiin with 2.5 equivalents of an acylating agent in methylene chloride followed by portionwise addition of aluminum chloride. The temperature of the reaction is maintained below zero degrees with continuous stirring. After the additions are complete the temperature may be elevated to 25°–40° C. for 12 to 36 hours. The reaction mixture is worked up in the usual manner by decomposing the complex with ice water/HCl. The product obtained is recrystallized from methylene chloride, chloroform, or the like. The procedure may be varied such there is a reverse addition of acylating agent and Lewis acid, or a reverse addition of aromatic hydrocarbon and Lewis acid. The more reactive halogen derivative, that is, the bis(ω-iodoalkanoyl)phenoxathiin may be prepared from the corresponding bis-chloro derivative using a halogen exchange reaction under the conditions generally employed in the Conant-Finkelstein reaction.

An alternate method to the preparation of the bis (bromoacetyl)phenoxathiin derivative is to reflux cupric bromide and an appropriate diacetylphenoxathiin in a suitable solvent such as ethyl acetate.

Of typical amines, 2, useful in reaction 1, there can be mentioned, for example, ammonia, or a compound which is a potential source of ammonia such as, for example, hexamethylenetetramine and the like; primary amines such as ethylamine, propylamine and the like; and secondary amines such as diethylamine, dibutylamine, piperidine, 4-methylpiperidine, morpholine, piperazine, N-ethylpiperazine, and the like.

The amination of bis(ω-haloalkanoyl)phenoxathiin, 1, may be carried out under a variety of conditions. For example, Compound 1 may be heated together with a large excess of the amine, 2, the excess amine serving as the reaction medium and the hydrohalide acceptor. This method is particularly suitable for readily available amines, the excess of which can be easily removed from the reaction mixture by, for example, distillation at reduced pressure or by washing the product with water. Or, one equivalent of Compound 1 and four equivalents of the amine, 2, may be heated together in one of a number of different types of solvents, for example, in aromatic solvents such as benzene, toluene, xylene, and the like; or ethers such as tetrahydrofuran, dioxane and the like; or ketones such as acetone, butanone and the like; or aprotic solvents such as N,N-dimethylformamide, N,N-dimethylacetamide, dimethylsulfoxide and the like; or mixtures of these solvents with water. The reaction between Compound 1 wherein the halogen is chlorine and the amine, 2, is frequently promoted by the addition of either sodium or potassium iodide, the iodide being used in either catalytic or stoichiometric amounts. In some cases, it may be advantageous to use only two equivalents of the amine, 2, for each equivalent of the bis(ω-haloalkanoyl)phenoxathiin, 1, an excess of an inorganic base such as powdered sodium or potassium carbonate being used as the hydrohalide acceptor. The reactor will proceed normally in 12 hours to two weeks at temperatures of −30° to 150° C. As volatile amines are employed, the reaction is best carried out under pressure in a suitable pressure reactor or autoclave.

Alternately, the amination reaction may be carried out on a derivative of Compound 1 such as the phenoxathiin bis-ketal derivatives, which may be prepared by allowing bis(ω-haloalkanoyl)phenoxathiin derivative and an excess of ethyl orthoformate to react in the presence of an acid catalyst such as hydrochloric acid for several days in a polar solvent such as ethanol, tetrahydrofuran and the like. The aminoketal derivative is hydrolyzed to the product of the invention by warming with dilute acid.

The compounds of Formula I wherein A is an alkylene chain of 3 to 6 carbon atoms may also be prepared by the reaction of a Grignard reagent with a bis-amide of phenoxathiin as represented by the following reaction:

Reaction 2

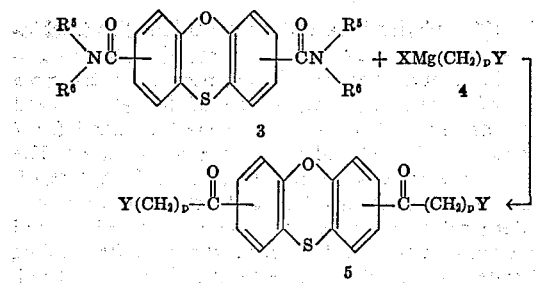

In the above reaction $R^5$ and $R^6$ are hydrogen or lower alkyl, or $-NR^5R^6$ taken together form a saturated monocyclic heterocyclic group such as piperidino or pyrrolidino; X is bromine or chlorine, p is an integer of from 3 to 6, Y may be any of the groups defined hereinbefore except those which contain a hydrogen attached to the nitrogen atom.

The addition of the Grignard reagent, 4, is carried out at low temperatures ranging from $-70°$ to $0°$ C. Once this addition is complete, Reaction 2 will proceed in from 1 to 24 hours at a temperature ranging from $0°$ to $80°$ C.

The Grignard reagent, 4, may be prepared by reacting magnesium and an aminoalkyl halide of the formula $X(CH_2)_pY$ wherein X, p and Y have the meaning defined hereinabove.

The phenoxathiin bis-amides, 3, may be prepared by generally known methods from the corresponding phenoxathiin bis-acids such as the known 1,6-, 2,8-, 4,6- or 1,9-diacids.

The compounds of Formula I wherein A is

and Y is any of the groups defined hereinbefore, except those which contain two hydrogens on the nitrogen atom, may also be prepared by the Mannich reaction as represented by the following:

Reaction 3

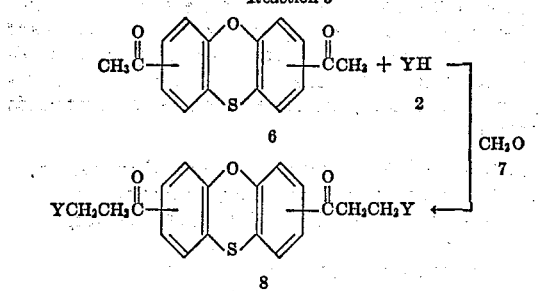

By combining one equivalent of Compound 6 and two or more equivalents of Compound 2 with three or more equivalents of formaldehyde, 7, the reaction will proceed in from 1 to 24 hours in solvents such as water, acetic acid, ethanol, butanol, dioxane, tetrahydrofuran and the like and at temperatures equivalent to the reflux temperature of the solvent. In this reaction either of two sources of formaldehyde may be employed. When formalin is used the reaction may be conducted with a suspension of Compound 6 or a co-solvent such as methanol may be added to allow the reaction to proceed in a homogeneous medium. When the source of formaldehyde is paraformaldehyde the reaction is carried out in an organic solvent such as those mentioned above. It is sometimes desirable to add a slight excess of hydrochloric acid to promote depolymerization of paraformaldehyde either during the reaction or at the end of the reaction.

The secondary amine, Compound 2, employed in this reaction may be added to the reaction medium as the hydrochloride salt or as the base form with subsequent in situ formation of the hydrochloride salt by the addition of hydrochloric acid. Of typical secondary amines which may be utilized in the above reaction there can be mentioned, for example, dimethylamine, dibutylamine, piperidine, 4-methylpiperidine, morpholine, N-ethylpiperazine and the like.

The diacetyl phenoxathiin compound, 6, may be prepared by a Friedel-Crafts acylation reaction on phenoxathiin or by addition of a methyl Grignard reagent to a phenoxathiin bis-amide or bis-nitrile. The phenoxathiin bis-amides may be obtained by methods described hereinbefore. The nitriles may be obtained through a Sandmeyer reaction from the corresponding diamines such as the known 2,8 or 3,7 diamines.

EXAMPLES

Representative compounds and compositions of the present invention and several of the methods of preparing them, mentioned above, are illustrated in the following specific examples.

Example 1

2,7-bis(5-chlorovaleryl)phenoxathiin; 2,8-bis(5-chlorovaleryl) phenoxathiin.—To a mixture of 100.0 g. (0.5 mole) phenoxathiin, 193.8 g. (1.25 moles) of 5-chlorovaleryl chloride and 3 liters of dried methylene chloride cooled to $-20°$ C. was added slowly over ¼ hour 146.7 g. (1.1 moles) of aluminum chloride, maintaining a temperature of below $-10°$ C. The reaction mixture was allowed to warm slowly to room temperature and then refluxed for 4 hours and cooled to room temperature. The mixture was decomposed by pouring cautiously into 3 liters of ice water, and the layers were separated. The aqueous layer was extracted again with methylene chloride. The methylene chloride layers were combined and evaporated to a small volume and cooled. The resulting solids were filtered off and fractional crystallization from carbon tetrachloride separated the isomers. The separated isomers were further purified by recrystallization from butanone: 2,7-bis(5-chlorovaleryl)phenoxathiin, M.P. 121–122° C., $\lambda_{max.}^{EtOH}$ 250 (695)

2,8-bis(5-chlorovaleryl)phenoxathiin, M.P. 130–132° C., $\lambda_{max.}^{EtOH}$ 266 (1175)

Example 2

2,7-bis(2-chloroacetyl)phenoxathiin; 2,8-bis(2-chloroacetyl)phenoxathiin.—Following the procedure of Example 1, only substituting for 5-chlorovaleryl chloride, 141.1 g. (1.25 moles) of 2-chloroacetyl chloride, the solid obtained was recrystallized from acetone to yield the desired products as a mixture. M.P. 199–206° C.

Example 3

2,7-bis(4-chlorobutyryl)phenoxathiin; 2,8-bis(4-chlorobutyryl)phenoxathiin.—Following the procedure of Example 1, only substituting for 5-chlorovaleryl chloride, 176.1 g. (1.25 moles) of 4-chlorobutyryl chloride, the resulting solids were separated by crystallization from chloroform instead of carbon tetrachloride: 2,7-bis(4-chlorobutyryl)phenoxathiin, M.P. 138–139° C., $\lambda_{max.}^{dioxane}$ 252 (715)

2,8-bis(4-chlorobutyryl)phenoxathiin, M.P. 126–128°C., $\lambda_{max.}^{dioxane}$ 267 (1285)

Example 4

2,8 - bis(4 - chloro-1,1-diethoxybutyl)phenoxathiin.—A mixture of 12.5 g. (0.03 mole) of 2,8 - bis(4 - chlorobutyryl)phenoxathiin, 13.3 g. (0.9 mole) of triethyl orthoformate, 200 ml. of dried absolute ethanol and 5 ml. of ethanolic HCl was stirred for 96 hours in a stoppered flask. The reaction mixture was decomposed with sodium methoxide. The solution was filtered off, washed with tetrahydrofuran and evaporated under vacuum to dryness to give the desired product.

Example 5

2,7 - bis(4 - chloro - 1,1 - diethoxybutyl)phenoxathiin.—Following the procedure of Example 4, only substituting for 2,8-bis(4-chlorobutyryl)phenoxathiin, 8.9 g. (0.022 mole) of 2,7-bis(4-chlorobutyryl)phenoxathin, the desired product was obtained.

Example 6

2,8-bis(5-piperidinovaleryl)phenoxathiin.—A mixture of 35 g. (0.08 mole) 2,8-bis(5-chlorovaleryl)phenoxathiin, 2 g. potassium iodide, 100 ml. piperidine and 100 ml. tetrahydrofuran was heated for 24 hours with stirring in a Paar bomb at 110° C. After cooling, the mixture was filtered and washed with tetrahydrofuran and the filtrate evaporated to dryness. The residue was cooled and diluted with water. The mixture was extracted twice with ether, the ether extracts combined and filtered. The filtrate was evaporated to dryness, cooled and diluted with pentane followed by filtering off of the solid, washing with pentane and drying. The residue was recrystallized from isopropanol to yield the desired product. M.P. 128.5–129.5° C., $$\lambda_{max.}^{EtOH} \ 267 \ (984)$$

Example 7

2,7-bis(5 - piperidinovaleryl)phenoxathiin.—Following the procedure of Example 6, only substituting for 2,8-bis(5-chlorovaleryl)phenoxathiin, 9.2 g. (0.021 mole) of 2,7-bis(5-chlorovaleryl)phenoxathiin the product was obtained, M.P. 93–94° C., $$\lambda_{max.}^{EtOH} \ 251 \ (562)$$

EXAMPLE 8

2,8 - bis(4 - piperidinobutyryl)phenoxathiin.—A mixture of 16.7 g. (0.03 mole) 2,8-bis(4-chloro-1,1-diethoxybutyl)phenoxathiin, 1 g. of potassium iodide, 50 ml. of piperidine and 50 ml. of tetrahydrofuran was heated for 24 hours with stirring in a Paar bomb at 110° C. After cooling, the mixture was filtered and the filtrate evaporated to dryness. The residue was cooled, dissolved in 10% HCl and refluxed. The solution was cooled, filtered, the filtrate made alkaline with 20% NaOH and extracted twice with methylene chloride. The extracts were combined and evaporated to dryness and the residue was recrystallized from heptane. Upon drying the desired product was obtained. M.P. 115–116° C., $$\lambda_{max.}^{EtOH} \ 266 \ (1052)$$

Example 9

2,7-bis(4 - piperidinobutyryl)phenoxathiin.—Following the procedure of Example 8, only employing 12.3 g. (0.022 mole) of 2,7-bis(4-chloro-1,1-diethoxybutyl)phenoxathiin for 2,8-bis(4-chloro-1,1-diethoxybutyl)phenoxathiin, along with 1 g. of potassium iodide, 50 ml. of piperidine and 50 ml. of tetrahydrofuran and recrystallizing the residue in heptane the desired product is obtained. M.P. 106–107° C., $$\lambda_{max.}^{EtOH} \ 250 \ (637)$$

Example 10

2,7-bis(2-diethylaminoacetyl)phenoxathiin dihydrochloride.—A mixture of 24.7 g. (0.07 mole) 2,7- and 2,8-bis(2-chloroacetyl)phenoxathiin (mixture from Example 2), 2 g. of potassium iodide, 200 ml. of diethylamine and 500 ml. of tetrahydrofuran was allowed to stand for 7 days and then filtered and the filtrate concentrated. The residual concentrate was dissolved in 10% HCl, filtered, the filtrate was made alkaline and extracted twice with methylene chloride. The extracts were combined, filtered and the filtrate evaporated about ½ volume. After cooling the filtrate was acidified with etheral HCl to Congo red. The resulting precipitate was diluted twice with ethyl ether, the solid filtered off and dried. The solid was recrystallized from methanol and diethyl ether and dried to give the desired product. M.P. 176–179° C. (dec.), $$\lambda_{max.}^{Et} \ 253 \ (489)$$

The 2,8-isomer was not isolated.

Example 11

2,7-bis(3-diethylaminopropionyl)phenoxathiin dihydrochloride.—A mixture of 11.4 g. (0.03 mole 2,7-bis(3-chloropropionyl)phenoxathiin, 1 g. of potassium iodide, 75 ml. of diethylamine and 75 ml. of tetrahydrofuran was allowed to stand for 3 days then filtered and the filtrate evaporated to dryness. The residue was dissolved in ethanol and acidified with etheral HCl to Congo red. The solution was diluted with ethyl ether and the solid filtered off. The solid was thrice dissolved in methanol, filtered, precipitated with ethyl ether and filtered. The resulting product was dried to give the desired product. M.P. 189–190° C., $$\lambda_{max.}^{EtOH} \ 251 \ (472)$$

Example 12

Following the procedure of Example 6, only substituting for piperidine the appropriate molar equivalent amounts of N-methylpiperazine, 4-methylpiperidine, 4-propylpiperidine, pyrrolidine, morpholine, methylcyclohexylamine and diallylamine, the following compounds are prepared:

2,8-bis[5-(4-methyl-1-piperazinyl)valeryl]phenoxathiin,
2,8-bis[5-(4-methylpiperidino)valeryl]phenoxathiin,
2,8-bis[5-(4-propylpiperidino)valeryl]phenoxathiin,
2,8-bis(5-pyrrolidinovaleryl)phenoxathiin,
2,8-bis(5-morpholinovaleryl)phenoxathiin,
2,8-bis[5-(N-methylcyclohexylamino)valeryl]phenoxathiin, and
2,8-bis(5-diallylaminovaleryl)phenoxathiin.

Example 13

An illustrative composition for hard gelatin capsules is as follows:

| | Per capsule, mg. |
|---|---|
| (a) 2,8-bis(5-piperidinovaleryl)phenoxathiin | 200 |
| (b) Talc | 35 |

The formulation is prepared by passing the dry powders of (a) and (b) through a fine mesh screen and mixing them well. The powder is then filled into No. 0 hard gelatin capsules at a net fill of 235 mg. per capsule.

Example 14

An illustrative composition for tablets is as follows:

| | Per tablet, mg. |
|---|---|
| (a) 2,8-bis(5-piperidinovaleryl)phenoxathiin | 100 |
| (b) Wheat starch | 15 |
| (c) Lactose | 33.5 |
| (d) Magnesium stearate | 1.5 |

Preparation.—A granulation obtained upon mixing lactose with the starch and granulated starch paste is dried, screened and mixed with the active ingredient and magnesium stearate. The mixture is compressed in tablets weighing 150 mg. each.

Example 15

An illustrative composition for pills is as follows:

| | Per pill, mg. |
|---|---|
| (a) 2,8-bis(5-piperidinovaleryl)phenoxathiin | 100 |
| (b) Starch, corn | 90 |
| (c) Liquid glucose | 10 |

The pills are prepared by blending the active ingredient and starch and then adding the liquid glucose with thorough kneading to form a plastic mass. The pills are then cut and formed from the plastic pill mass.

Example 16

A 2% weight per volume syrup of 2,8-bis(5-piperidinovaleryl)phenoxathiin can be prepared by the usual pharmaceutical techniques according to the following formula:

| | Grams |
|---|---|
| (a) Finely divided 2,8 - bis(5 - piperidinovaleryl) phenoxathiin | 2.0 |
| (b) Sucrose | 33.3 |
| (c) Chloroform | 0.25 |
| (d) Sodium benzoate | 0.4 |
| (e) Methyl p-hydroxybenzoate | 0.02 |
| (f) Vanillin | 0.04 |
| (g) Glycerol | 1.5 |
| (h) Purified water to 100.0 ml. | |

Example 17

2,8-bis(5-piperidinovaleryl)phenoxathiin is mixed with soybean meal to prepare an animal feed concentrate containing 10 grams of said phenoxathiin compound per pound of the medicated feed. This can subsequently be diluted with a mixed grain ration to give a medicated feed containing 50 milligrams of the phenoxathiin per pound of the medicated feed.

Example 18

The following formulation is illustrative of a dusting powder:

| | Per kilogram, grams |
|---|---|
| (a) 2,8-bis(5-piperidinovaleryl)phenoxathiin | 20 |
| (b) Silica aerogel | 980 |

The dusting powder is prepared by intimately admixing the ingredients. The mixture is then packaged in dispensing containers.

Example 19

An illustrative composition for a parenteral injection is the following aqueous emulsion.

| Each ml. contains | Ingredients | Amount, g. |
|---|---|---|
| 50 mg. | 2,8-bis(5-piperidinovaleryl)phenoxathiin | 1.000 |
| 100 mg. | Polyoxyethylene sorbitan monooleate | 2.000 |
| 0.0064 gm. | Sodium chloride | 0.128 |
| | Water for injection, q.s. | [1] 20.000 |

[1] Milliliter.

The composition of Example 19 is prepared by dissolving 0.64 g. of sodium chloride in 100 ml. of water for injection; mixing the polyoxyethylene sorbitan monooleate with the phenoxathiin, adding a sufficient solution of the sodium chloride in water to the active ingredient and polyoxyethylene sorbitan monooleate to make 20 ml.; shaking the mixture; and then autoclaving it for 20 minutes at 110° C. at 15 p.s.i.g. steam pressure. The composition can be dispensed in a single ampule for multiple dosage or in 10 or 20 ampules for single dosages.

Examples 20 to 27 illustrate in vivo antiviral studies with compounds, also referred to as active ingredients, of this invention. In each of the examples the compounds were antivirally active. In the examples, the compounds showed antiviral activity by prolonging the mean day of death of the treated animals as compared to the control animals, during the period of observation. The dosage levels of the compounds used in the examples were within the range of 10 to 250 mg. per kg. of animal body weight for each time the compound was administered.

Table A lists the active ingredient which was administered in each of the examples. Although it is believed that the headings in the examples are self-explanatory, some of the headings are explained as follows. The "challenge," that is, the inoculation with a virus used is generally fatal to all the untreated, that is, control animals in the experiment. "Time of death" refers to the average time of death for the untreated animals. The "treatment" was prophylactic or therapeutic or both. The term "volume" refers to the volume of composition administered per dose which contained the active ingredient dissolved in sterile water which also contained 0.15% of hydroxyethylcellulose. The control animals received a sham dosage of the same volume of the vehicle which did not contain the active ingredient. The abbreviation "STR" is survival time ratio, which is calculated by dividing the mean day of death of the control animals into the mean day of death of the treated animals during the period of observation. The activity of the compound in the examples involved is further characterized, for example, low, medium, high and so forth. A survival time ratio (STR) of less than 0.90 indicates the compound was toxic; a ratio of 0.90 to 1.09 indicates that there is no activity; a ratio of 1.10 to 1.19 indicates low or weak activity; a ratio of 1.20 to 1.29 indicates medium activity; and a ratio of 1.30 and greater indicates high activity.

TABLE A

Examples 20 and 21: 2,8-bis(5-piperidinovaleryl)phenoxathiin.

Example 22: 2,7-bis(2-diethylaminoacetyl)phenoxathiin dihydrochloride.

Examples 23 and 24: 2,7-bis(3-diethylaminopropionyl) phenoxathiin dihydrochloride.

Example 25: 2,8-bis(4-piperidinobutyryl)phenoxathiin.

Examples 26 and 27: 2,7-bis(4-piperidinobutyryl)phenoxathiin.

| | Example 20 | Example 21 | Example 22 | Example 23 |
|---|---|---|---|---|
| Virus | Encephalomyocarditis | Encephalomyocarditis | Encephalomyocarditis | Encephalomyocarditis. |
| Type | RNA; Picornavirus | RNA; Picornavirus | RNA; Picornavirus | RNA; Picornavirus. |
| Challenge | 10 LD$_{50}$ | 10 LD$_{50}$ | 5 LD$_{50}$ | 12 LD$_{50}$. |
| Route | Subcutaneous | Subcutaneous | Subcutaneous | Subcutaneous. |
| Time of death | 4.5 days | 4.5 days | 4.5 days | 4.5 days. |
| Period of observation | 9 days | 9 days | 9 days | 9 days. |
| Animal | Mice | Mice | Mice | Mice. |
| Weight | 12-15 grams | 12-15 grams | 12-15 grams | 12-15 grams. |
| No. in treated group | 10 | 9 | 10 | 10. |
| No. in control group | 20 | 20 | 20 | 20. |
| Treatment | Prophylactic and therapeutic. | Prophylactic and therapeutic. | Prophylactic and therapeutic. | Prophylactic. |
| Dosage level | 10 mg./kg. | 50 mg./kg. | 250 mg./kg. | 50 mg./kg. |
| Route | Subcutaneous | Oral | Subcutaneous | Subcutaneous. |
| Volume | 0.25 ml. | 0.25 ml. | 0.25 ml. | 0.25 ml. |
| Time pre-challenge | 28, 22, 2 hours | 28, 22, 2 hours | 28, 22, 2 hours | 28, 22, 2 hours. |
| Time post-challenge | 2 hours | 2 hours | 2 hours | None. |
| Results, STR | 1.60 | 1.20 | 1.51 | 1.87. |

| | Example 24 | Example 25 | Example 26 | Example 27 |
|---|---|---|---|---|
| Virus | Encephalomyocarditis | Encephalomyocarditis | Encephalomyocarditis | Encephalomyocarditis. |
| Type | RNA; Picornavirus | RNA; Picornavirus | RNA; Picornavirus | RNA; Picornavirus. |
| Challenge | 12 LD$_{50}$ | 12 LD$_{50}$ | 12 LD$_{50}$ | 12 LD$_{50}$. |
| Route | Subcutaneous | Subcutaneous | Subcutaneous | Subcutaneous. |
| Time of death | 4.5 days | 4.4 days | 4.4 days | 4.4 days. |
| Period of observation | 9 days | 9 days | 9 days | 9 days. |
| Animal | Mice | Mice | Mice | Mice. |
| Weight | 12-15 grams | 12-15 grams | 12-15 grams | 12-15 grams. |
| No. in treated group | 10 | 10 | 10 | 10. |
| No. in control group | 20 | 20 | 20 | 20. |
| Treatment | Prophylactic | Prophylactic and therapeutic. | Prophylactic and therapeutic. | Prophylactic and therapeutic. |
| Dosage level | 250 mg./kg. | 10 mg./kg. | 10 mg./kg. | 50 mg./kg. |
| Route | Oral | Subcutaneous | Subcutaneous | Oral. |
| Volume | 0.25 ml. | 0.25 ml. | 0.25 ml. | 0.25 ml. |
| Time pre-challenge | 22 hours | 28, 22, 2 hours | 28, 22, 2 hours | 28, 22, 2 hours |
| Time post-challenge | None | 2 hours | 2 hours | 2 hours. |
| Results, STR | 1.18 | 1.43 | 1.34 | 1.11. |

What is claimed is:

1. A phenoxathiin compound selected from a base of the formula

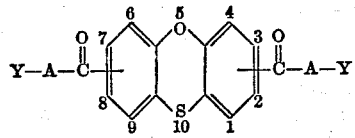

wherein the

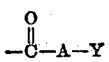

groups are attached at the 1,6-, 1,9-, 2,7-, 2,8-, 3,7- or 4,6-positions of phenoxathiin radical; A is a straight or branched alkylene chain having from 1 to 6 carbon atoms; and each Y is selected from (A) the group

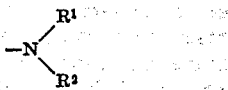

wherein $R^1$ and $R^2$ are individually selected from hydrogen, lower alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or (B) the group

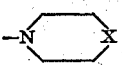

wherein X is oxygen or $NR^4$, and $R^4$ is hydrogen or lower alkyl of from 1 to 4 carbon atoms; or a pharmaceutically acceptable acid addition salt thereof.

2. A compound of claim 1 wherein one of the

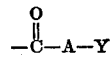

groups is in the 2-position of the tricyclic ring system and the other such group is in the 7- or 8-position.

3. A compound of claim 2 wherein each Y is the group

4. A compound of claim 2 wherein each Y is the group

5. A compound of claim 2 which is 2,7-bis(diethylaminoacetyl)phenoxathiin or a pharmaceutically acceptable acid addition salt thereof.

6. A compound of claim 2 which is 2,7-bis(3-diethylaminopropionyl)phenoxathiin or a pharmaceutically acceptable acid addition salt thereof.

References Cited

UNITED STATES PATENTS 3,642,997   2/1972   Shen et al. ——————— 424—250

HENRY R. JILES, Primary Examiner

C. M. S. JAISLE, Assistant Examiner

U.S. Cl. X.R.

260—268 TR, 293.57, 326.5 SA, 327 P; 424—248, 250, 267, 274, 276